United States Patent [19]
Kato et al.

[11] Patent Number: 5,336,540
[45] Date of Patent: Aug. 9, 1994

[54] CONNECTOR

[75] Inventors: Tetsuo Kato; Masahiro Kanda, both of Shizuoka; Tatsuo Tsumiyama; Satoru Nakamoto, both of Yamaguchi, all of Japan

[73] Assignees: Yazaki Corporation, Tokyo; UBE Industries, Ltd., Yamaguchi, both of Japan

[21] Appl. No.: 997,318

[22] Filed: Dec. 28, 1992

[30] Foreign Application Priority Data

Dec. 27, 1991 [JP] Japan .................. 3-347070

[51] Int. Cl.$^5$ .............................. C09L 77/10
[52] U.S. Cl. ..................... 428/36.92; 525/66
[58] Field of Search .............. 325/66; 428/36.92

[56] References Cited

FOREIGN PATENT DOCUMENTS

| | | |
|---|---|---|
| 0315451 | 10/1989 | European Pat. Off. . |
| 0397531 | 11/1990 | European Pat. Off. . |
| 60-170665 | 9/1985 | Japan . |
| 1146942 | 6/1989 | Japan . |
| 1311580 | 12/1989 | Japan . |

OTHER PUBLICATIONS

Derwent Accession No. 89-029 622 (04), Questel Telesystems (WPIL) Derwent Publications Ltd., London for JP-A-63-305148.

Primary Examiner—Ana L. Carrillo
Attorney, Agent, or Firm—Sughrue, Mion, Zinn, Macpeak & Seas

[57] ABSTRACT

A connector comprising a housing comprising a resin composition comprising:

(A) from 50 to 95 parts by weight of a semi-aromatic polyamide comprising (A1) an adipate of hexamethylenediamine and (A2) a terephthalate of hexamethylenediamine, where the weight ratio of the adipate of hexamethylenediamine (A1) to the terephthalate of hexamethylenediamine (A2) is from 80/20 to 50/50; and (B) from 5 to 50 parts by weight of a modified polyolefin comprising (B1) a polyolefin copolymer comprising (B11) propylene and (B12) ethylene where the molar ratio of propylene (B11) to ethylene (B12) is from 90/10 to 99/1, the polyolefin copolymer (B1) being graft-modified with (B2) from 0.05 to 5 parts by weight of an $\alpha,\beta$-unsaturated carboxylic acid, an anhydride thereof, or a derivative thereof per 100 parts by weight of the polyolefin copolymer (B1).

12 Claims, 2 Drawing Sheets

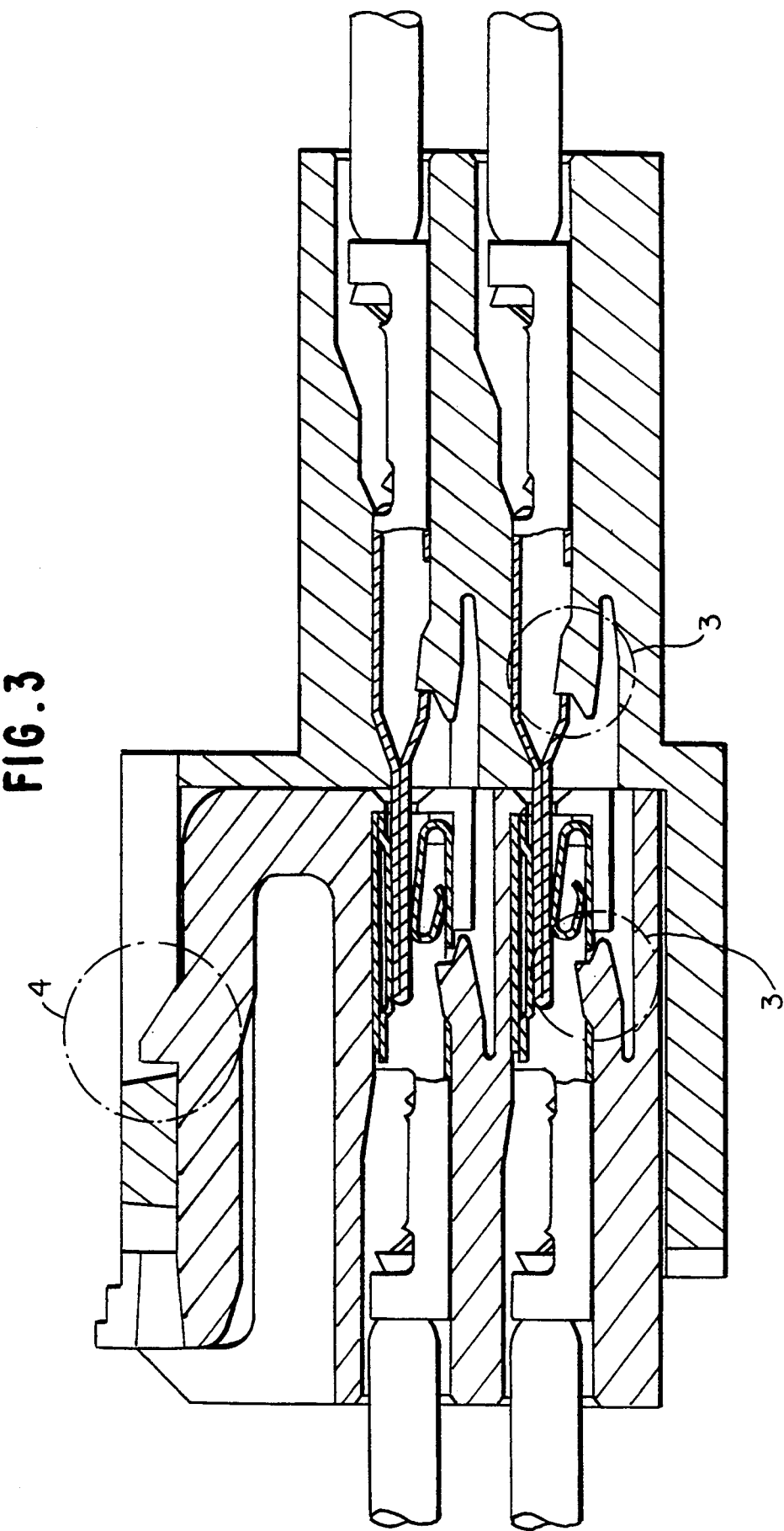

CONNECTOR

FIELD OF THE INVENTION

The present invention relates to a connector of light weight that is excellent in dimensional stability, heat resistance, mechanical properties and productivity, and also is excellent in fitting feeling.

BACKGROUND OF THE INVENTION

Hitherto, for connecting the circuits of electric and electronic instruments or devices of motor cars, connectors equipped with various kinds of plastic housings (hereinafter, sometimes referred to as simply "connectors") have been used. Recently, with the progress of the light-weight construction of a motor car together with the low air pollution by a motor car, the requirement for the light weight of connectors has been increased. Furthermore, with the increase of the performance and the function of a motor car, the connector has been required miniaturization, complication in its form, and improvement in heat resistance, fitting feeling and productivity thereof.

A PBT (polybutene terephthalate) resin excellent in heat resistance, dimensional stability and moldability has conventionally been used as a connector in large quantity, but since the PBT resin has a high specific gravity, there is a problem in that the weight of the connector made of the resin is increased. A 6-nylon resin and a 6,6-nylon resin are suitable for a light-weight connector since the specific gravity of these resins is lower than that of the PBT resin. However, these resins have problems in that they have a high water absorption to cause a dimensional change and deterioration of the mechanical properties by the absorption of water, and the connectors made of these resins are not suitable for miniaturized connectors, complication in its form, and improvement in fitting feeling.

In addition to the foregoing resins, a PP (polypropylene) resin, a PPE (polyphenyleneether) resin, an ABS (acrylonitrile-butadiene-styrene copolymer) resin, etc., have also been used, but these resins have problems in that they are inferior in heat resistance, chemical resistance, fluidity, etc., and hence these resins are not satisfactory.

Attempts to reduce the weight of connectors by foaming resins, or adding a hollow filler to resins have been investigated but in these attempts, there are problems in that the molding accuracy is insufficient, and the deterioration of the mechanical properties is severe.

SUMMARY OF THE INVENTION

An object of the present invention is to solve the foregoing problems in the conventional techniques and to provide a connector having a light weight, being excellent in dimensional stability, heat resistance, mechanical properties and productivity, and also being excellent in fitting feeling.

Other objects and effects of the present invention will be apparent from the following description.

As a result of various investigations for attaining the foregoing objects, the present inventors have discovered that a connector formed by molding a resin blend comprising a specific semi-aromatic polyamide and a specific modified polyolefin attains the foregoing objects and succeeded in accomplishing the present invention.

The present invention relates to a connector comprising a housing comprising a resin composition comprising:

(A) from 50 to 95 parts by weight of a semi-aromatic polyamide comprising (A1) an adipate of hexamethylenediamine and (A2) a terephthalate of hexamethylenediamine, the weight ratio of the adipate of hexamethylenediamine (A1) to the terephthalate of hexamethylenediamine (A2) being from 80/20 to 50/50; and (B) from 5 to 50 parts by weight of a modified polyolefin comprising (B1) a polyolefin copolymer comprising (B11) propylene and (B12) ethylene, the molar ratio of propylene (B11) to ethylene (B12) being from 90/10 to 99/1, the polyolefin copolymer (B1) being graft-modified with (B2) from 0.05 to 5 parts by weight of an $\alpha,\beta$-unsaturated carboxylic acid, an anhydride thereof, or a derivative thereof per 100 parts by weight of the polyolefin copolymer (B1).

BRIEF DESCRIPTION OF THE DRAWINGS

FIG. 3 is a cross sectional view showing a connector for motor car produced in the example of the present invention where an external and internal housings are fitted to each other.

DETAILED DESCRIPTION OF THE INVENTION

Figure 1:
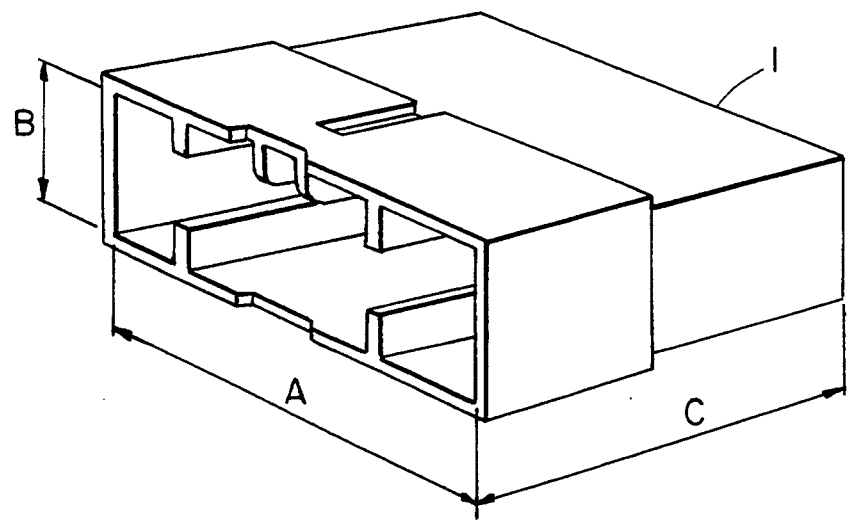
FIG. 1 is a slant view showing an external housing of the connector for motor car produced in the example of the present invention.

The semi-aromatic polyamide (A) for constituting the resin composition used in the present invention comprises a copolymer of (A1) adipate of hexamethylenediamine (hereinafter, sometimes referred to as simply "AH salt") and (A2) terephthalate of hexamethylenediamine (hereinafter, sometimes referred to as simply "6T salt"). The weight ratio of the AH salt (A1) to the 6T salt (A2) is from 80/20 to 50/50, and preferably from 70/30 to 50/50.

The semi-aromatic polyamide (A) can be produced by various conventionally known methods such as a solvent method where an adipic acid halide and a terephthalic acid halide are mixed with hexamethylenediamine so as to polycondense them in a uniform solution, a method where AH salt and 6T salt are melt-polymerized in an autoclave, a method where AH salt and 6T salt are solid-phase-polymerized, and the like methods.

The semi-aromatic polyamide (A) preferably has a relative viscosity $\eta_r$ measured at 25° C. in a 98% concentrated sulfuric acid solution of from 1.0 to 3.5, and more preferably from 1.5 to 3.0.

The modified polyolefin (B) constituting the resin composition used in the present invention comprises a modified copolymer obtained by graft-modifying (B1) 100 parts by weight of a polyolefin copolymer with (B2) from 0.05 to 5 parts by weight, preferably from 0.1 to 3 parts by weight, more preferably from 0.3 to 1.5 parts by weight, of an $\alpha,\beta$-unsaturated carboxylic acid, an anhydride thereof, or a derivative thereof. The polyolefin copolymer (B1) comprises (B11) propylene and (B12) ethylene, and the molar ratio of propylene (B11) to ethylene (B12) is from 90/10 to 99/1, and preferably from 95/5 to 97/3. The polyolefin copolymer (B1) preferably has a melt flow rate of from 3 to 15 g/10 min.

Examples of the α,β-unsaturated carboxylic acid which is used as the monomer for the graft modification of the polyolefin copolymer include acrylic acid, methacrylic acid, maleic acid, fumaric acid, tetrahydrophthalic acid, itaconic acid, citraconic acid, and crotonic acid. Anhydrides and the derivatives of these acids, such as acid halides, amideimides, esters, etc., can also be used for the graft modification. Among these compounds, an unsaturated dicarboxylic acid and an acid anhydride thereof are preferably used.

The modified polyolefin (B) can be produced by various conventionally known methods such as a method where the above-mentioned amount of the monomer for the graft modification is added to the polyolefin copolymer, and the mixture is melt-kneaded. Upon melt-kneading, a radical generating agent such as a peroxide is generally added in an amount of from 0.001 to 5% by weight, preferably from 0.01 to 2% by weight, based on the amount of the modified polyolefin (B). Specific examples of the peroxide include "Perhexane 25B", "Perhexyne 25B" and "Perbutyl Z" produced by Nippon Oil and Fats Co., Ltd.

The modified polyolefin (B) may further contain an additive such as a hindered phenol antioxidant in an amount of from 0.05 to 0.3% by weight based on the amount of the modified polyolefin (B).

The resin composition of the present invention comprises from 50 to 95 parts by weight of the semi-aromatic polyamide (A) and from 5 to 50 parts by weight of the modified polyolefin (B) to form 100 parts by weight in total of the resin composition of the present invention. In other words, the weight ratio of the semi-aromatic polyamide (A) to the modified polyolefin (B) (A)/(B) is from 50/50 to 95/5. The ratio (A)/(B) is preferably from 65/35 to 90/10. If the content of the semi-aromatic polyamide (A) is less than 50 parts by weight, the heat resistance and the mechanical properties of the resin composition are reduced, and also the fitting feeling of a connector comprising the resin composition is lowered. If the content the semi-aromatic polyamide (A) is more than 95 parts by weight, the specific gravity of the resin composition is increased whereby the reduction of the weight of the connector is not obtained.

While the resin composition used for the connector of the present invention comprises the semi-aromatic polyamide (A) and the modified polyolefin (B) as the indispensable constitutional components, if necessary, the resin composition may further contain suitable additives such as an inorganic filler, an antioxidant, a weather resisting and light resisting stabilizer, a releasing agent, a nucleating agent, a heat resisting stabilizer, a plasticizer, a lubricant, an antistatic agent, a flame retarder, a pigment, a dye, etc. The amount of the additives are not particularly limited as long as the properties of the resin composition are not impaired.

The method for producing the resin composition of the present invention is not particularly limited, and examples thereof include a method where the above-mentioned components are compounded and kneaded by using a conventionally known compounding means such as a single axis or double axis extruder, a kneader and the like.

The housing of the connector according to the present invention can be produced by any conventionally known method. For example, it can be produced by injection-molding the resin composition produced as described above. The housing can be properly fabricated by appropriately selecting the number and the form of poles for inserting therein the terminals of the connector, the form of the lock portion, the form of the housing portion, etc., and there are no particular limitation not only in the use of the connector but also in the kind and the form of the connector.

The present invention will described in more detail by referring to the following examples, but the present invention is not construed as being limited to these examples.

EXAMPLE 1

A semi-aromatic polyamide having a melting point of 273° C. and a relative viscosity $\eta_r$ (of the 98% concentrated sulfuric acid solution) of 2.77 was produced by copolymerizing AH salt and 6T salt at a weight ratio of 70/30.

A modified polyolefin having a melt flow rate (determined by ASTM D-1238) of 50 g/10 min was produced by compounding 100 parts by weight of a polyolefin copolymer comprising propylene and ethylene (molar ratio of propylene to ethylene: 94/6) with 0.4 part by weight of maleic anhydride and 0.3 part by weight of a peroxide ("Perbutyl Z", trade name, made by Nippon Oil and Fats Co., Ltd.) as a radical generating agent, and melt-grafting the compounded mixture at 230° C. using a double axis extruder.

A mixture of 80 parts by weight of the above semi-aromatic polyamide and 20 parts by weight of the above polyolefin was compounded with 0.03 part by weight of copper iodide, 0.1 part by weight of potassium iodide, 0.15 part by weight of melamin, and 0.35 part by weight of a hindered phenol heat resisting agent ("Tominox TT", trade name, made by Yoshitomi Pharmaceutical Industries, Ltd.) as heat resisting agents, and the compounded mixture was knead and blended using a double axis extruder to provide a resin composition.

Figure 2:
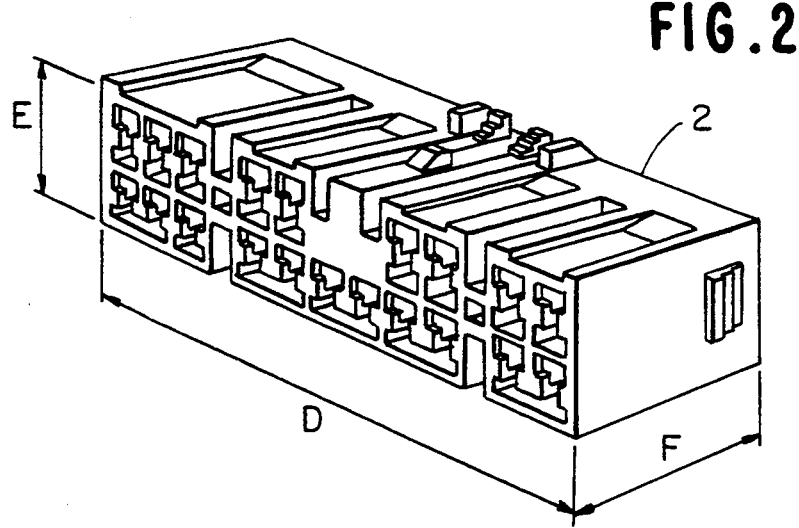
FIG. 2 is a slant view showing an internal housing of the connector for motor car produced in the example of the present invention.

The external and internal connector housings having the forms shown in FIG. 1 and FIG. 2, respectively, were prepared by molding the resin composition produced as described above using an injection molding machine ("IS55EN", trade name, manufactured by Toshiba Corporation) under the following molding conditions to provide a connector according to the present invention.

| Cylinder Temperature: | 290° C. |
|---|---|
| Mold Temperature: | 25° C. |
| Injection Pressure: | 800 kgf/cm$^2$ |
| Injection Speed: | Intermediate speed |

The length, height and depth (i.e., A, B, and C, respectively, in FIG. 1) of the external connector housing were 58.7 mm, 16.4 mm, and 38.0 mm, respectively, and the volume thereof was 11.58 cm$^3$. The length, height depth (i.e., D, E, and F, respectively, of FIG. 2) of the internal connector housing were 54.7 mm, 12.0 mm, and 22.0 mm, respectively, and the volume thereof was 5.45 cm$^3$. In FIGS. 1 and 2, numeral 1 denotes the external connector housing, and 2 denotes the internal connector housing.

EXAMPLE 2

A resin composition was produced by following the same procedure as Example 1 except that the compounding ratio of the semi-aromatic polyamide and the modified polyolefin was changed to 70/30 in place of 80/20.

By using the resin composition, external and internal connector housings were prepared by injection molding under the same molding conditions as in Example 1 to provide a connector according to the present invention.

EXAMPLE 3

A resin composition was produced by following the same procedure as Example 1 except that a modified polyolefin obtained by grafting 0.5 part by weight of itaconic acid was used in place of the modified polyolefin used in Example 1.

By using the resin composition, external and internal connector housings were prepared by injection molding under the same molding conditions as in Example 1 to provide a connector according to the present invention.

COMPARATIVE EXAMPLE 1

A resin composition was produced by following the same procedure as Example 1 except that the compounding ratio of the semi-aromatic polyamide and the modified polyolefin was changed to 40/60.

By using the resin composition, external and internal connector housings were prepared by injection molding under the same molding conditions as in Example 1 to provide a comparative connector.

COMPARATIVE EXAMPLE 2

A resin composition was produced by following the same procedure as Example 1 except that a 6,6-nylon resin ("2020UW1", trade name, made by Ube Industries, Ltd.) was used in place of the resin composition used in Example 1.

By using the resin composition, external and internal connector housings were prepared by injection molding under the same molding conditions as in Example 1 except that the cylinder temperature was changed to 280° C. to provide a comparative connector.

COMPARATIVE EXAMPLE 3

A resin composition was produced by following the same procedure as Example 1 except that a PBT resin ("1401-X08", trade name, made by Toray Industries, Inc.) was used in place of the resin composition used in Example 1.

By using the resin composition, external and internal connector housings were prepared by injection molding under the same molding conditions as in Example 1 except that the cylinder temperature was changed to 260° C. to provide a comparative connector.

Each of the connector housings thus obtained above was evaluated as follows and the properties were compared.

(1) Light Weight Property:

The specific gravity of each housing was measured by an in-water replacement method.

(2) Dimensional Change by Water Absorption:

Each housing was subjected to a moistening treatment under the conditions of 35° C. and 95% RH until the water absorption reached the saturated state, and the dimensional changes of the A, B, and C portions in FIG. 1 and the D, E, and F portions in FIG. 2 were measured. Each dimensional change ratio (%) after the moistening treatment with respect to the dimension of each portion immediately after molding was calculated by the following formula and evaluated.

$$\text{Dimensional change ratio } (\%) = (A - B)/B \times 100$$

A: Dimension of each portion at saturated water absorption

B: Dimension of each portion immediately after molding (3) Heat Resistance:

To each of the housing heat-treated for 1,000 hours at 120° C. and the housing immediately after molding was fixed a terminal having welded thereto an electric wire of a length of about 100 mm as shown in FIG. 3. In FIG. 3, numeral 3 denotes a fixed portion of the housing and the wire, and 4 denotes a fitted portion of the housings. The electric wire was then pulled in the axis direction at a constant rate of about 100 mm/min, and the load (terminal holding strength) (kgf) when the terminal was drawn from the fixed portion 3 was measured. The change of the external appearance of the housing by the heat treatment was also observed.

(4) Fitting Property:

The external and internal housing were subjected to a moistening treatment under the conditions of 35° C., 95% RH until the water absorption reached the saturated state, and the housings were fitted to each other at a rate of 250 mm/min in an anechoic chamber. The sound pressure level of the fitting sound generated on fitting was measured by a noise meter, and further the fitting sound was subjected to a frequency analysis using an analyzing recorder (manufactured by Yokogawa Hokushin Electric Corporation), whereby the fitting property was evaluated. The housings immediately after molding were also subjected to the same measurements for fitting properties. A connector having a high sound pressure level and a high frequency is evaluated to be a connector having a good fitting feeling, that is a good fitting property.

The evaluation results of each Examples and Comparative Examples are shown in Tables 1, 2, and 3 below.

TABLE 1

Light-weight property and dimensional stability by water absorption

| | Specific gravity | Dimensional change ratio (%) | | | | | |
|---|---|---|---|---|---|---|---|
| | | A | B | C | D | E | F |
| Example 1 | 1.08 | 0.387 | 0.267 | 0.398 | 0.290 | 0.243 | 0.326 |
| Example 2 | 1.07 | 0.320 | 0.258 | 0.412 | 0.276 | 0.224 | 0.332 |
| Example 3 | 1.08 | 0.380 | 0.268 | 0.402 | 0.282 | 0.245 | 0.318 |
| Comparative Example 1 | 1.04 | 0.211 | 0.208 | 0.223 | 0.145 | 0.221 | 0.231 |
| Comparative Example 2 | 1.14 | 1.289 | 1.101 | 1.311 | 1.146 | 1.009 | 1.287 |
| Comparative Example 3 | 1.31 | 0.102 | 0.030 | 0.111 | 0.034 | 0.028 | 0.049 |

TABLE 2

Heat resisting property

| | Terminal holding strength (kgf) | | | | Appearance change after heat treatment |
|---|---|---|---|---|---|
| | Immediately after molding | | After heat treatment | | |
| | Internal | External | Internal | External | |
| Example 1 | 9.8 | 9.4 | 10.6 | 10.3 | no |
| Example 2 | 10.0 | 9.7 | 11.1 | 10.6 | no |
| Example 3 | 9.2 | 9.0 | 10.0 | 9.8 | no |
| Comparative Example 1 | 4.6 | 4.5 | 3.8 | 4.0 | no |
| Comparative Example 2 | 11.7 | 10.0 | 12.6 | 11.1 | browned |

TABLE 2-continued

| | Heat resisting property | | | | |
|---|---|---|---|---|---|
| | Terminal holding strength (kgf) | | | | Appearance change after heat treatment |
| | Immediately after molding | | After heat treatment | | |
| | Internal | External | Internal | External | |
| Comparative Example 3 | 8.0 | 7.6 | 8.3 | 8.2 | no |

TABLE 3

| | Fitting properties | | | |
|---|---|---|---|---|
| | Immediately after molding | | After water absorption | |
| | Frequency (KHz) | Sound pressure (dB) | Frequency (KHz) | Sound pressure (dB) |
| Example 1 | 4.2 | 92 | 4.3 | 89 |
| Example 2 | 4.2 | 90 | 4.2 | 87 |
| Example 3 | 4.2 | 91 | 4.2 | 88 |
| Comparative Example 1 | 4.0 | 77 | 3.8 | 74 |
| Comparative Example 2 | 4.7 | 81 | 4.2 | 68 |
| Comparative Example 3 | 3.7 | 90 | 3.8 | 87 |

As shown in Tables 1, 2, and 3, it can be understood that in Examples 1 to 3 according to the present invention, the products have a low specific gravity, are excellent in the light weight property, cause neither dimensional change by the absorption of water nor problem for practical use, have the excellent dimensional stability, are excellent in the mechanical properties and the heat resistance, show very less reduction of the fitting property by the absorption of water, and have a sufficient fitting feeling. On the other hand, it can be understood that in Comparative Example 1, the product has a low specific gravity, is excellent in the light-weight property, shows less dimensional change by the absorption of water, and is excellent in the dimensional stability, but there are problems in that the mechanical strength such as the terminal holding force is low, the product is inferior in the heat resistance, and a sufficient fitting feeling is not obtained. In Comparison Example 2, a proper light-weight property is obtained, but the product is inferior in the dimensional stability and the fitting property by the adsorption of water. Furthermore, in Comparison Example 3, the product is excellent in the dimensional stability, the mechanical properties, the heat resistance, and the fitting property, but it has a high specific gravity and is inferior in the light-weight property.

As described above, the connector according to the present invention has the effects in that the weight is light, the dimensional change by the absorption of water is small, the heat resistance is high, the mechanical properties such as the terminal holding force, etc., are high, shows a very good fitting feeling, and is excellent in the productivity.

While the invention has been described in detail and with reference to specific examples thereof, it will be apparent to one skilled in the art that various changes and modifications can be made therein without departing from the spirit and scope thereof.

What is claimed is:

1. A connector comprising a housing comprising a resin composition comprising:
   (A) from 50 to 95 parts by weight of a semi-aromatic polyamide comprising a reaction product of (A1) an adipate of hexamethylenediamine and (A2) a terephthalate of hexamethylenediamine, the weight ratio of said adipate of hexamethylenediamine (A1) to said terephthalate of hexamethylenediamine (A2) being from 80/20 to 50/50, and
   (B) from 5 to 50 parts by weight of a modified polyolefin comprising (B1) a polyolefin copolymer comprising a reaction product of (B11) propylene and (B12) ethylene, the molar ratio of propylene (B11) to ethylene (B12) being from 90/10 to 99/1, said polyolefin copolymer (B1) being graft-modified with (B2) from 0.05 to 5 parts by weight of an $\alpha,\beta$-unsaturated carboxylic acid or a derivative thereof per 100 parts by weight of said polyolefin copolymer (B1).

2. A connector as claimed in claim 1, wherein said semi-aromatic polyamide (A) has a relative viscosity $\eta_r$ measured at 25° C. in a 98% concentrated sulfuric acid solution of from 1.0 to 3.5.

3. A connector as claimed in claim 1, wherein the weight ratio of said adipate of hexamethylenediamine (A1) to said terephthalate of hexamethylenediamine (A2) is from 70/30 to 50/50.

4. A connector as claimed in claim 1, wherein said modified polyolefin (B) has a melt flow rate of from 3 to 15 g/10 min.

5. A connector as claimed in claim 1, wherein the molar ratio of propylene (B11) to ethylene (B12) is from 95/5 to 97/3.

6. A connector as claimed in claim 1, wherein said polyolefin copolymer (B1) is graft-modified with from 0.1 to 3 parts by weight of said $\alpha,\beta$-unsaturated carboxylic acid or a derivative thereof (B2) per 100 parts by weight of said polyolefin copolymer (B1).

7. A connector as claimed in claim 6, wherein said polyolefin copolymer (B1) is graft-modified with from 0.3 to 1.5 parts by weight of said $\alpha,\beta$-unsaturated carboxylic acid or a derivative thereof (B2) per 100 parts by weight of said polyolefin copolymer (B1).

8. A connector as claimed in claim 1, wherein said $\alpha,\beta$-unsaturated carboxylic acid or a derivative thereof (B2) is selected from an unsaturated dicarboxylic acid and an acid anhydride thereof.

9. A connector as claimed in claim 1, wherein the weight ratio of said semi-aromatic polyamide (A) to said modified polyolefin (B) is from 65/35 to 90/10.

10. A connector as claimed in claim 1, wherein said derivative is an anhydride.

11. A connector as claimed in claim 6, wherein said derivative is an anhydride.

12. A connector as claimed in claim 7, wherein said derivative is an anhydride.

* * * * *